H. SCHUMACHER.
Folding Knives and Forks.

No. 136,552.                  Patented March 4, 1873.

Witnesses:
Harry M. Niedersheim
Jacob E. Schiedt

Inventor:
Henry Schumacher
by John A. Wiedersheim
Atty.

UNITED STATES PATENT OFFICE.

HENRY SCHUMACHER, OF PHILADELPHIA, PENNSYLVANIA.

IMPROVEMENT IN FOLDING KNIVES AND FORKS.

Specification forming part of Letters Patent No. 136,552, dated March 4, 1873.

*To all whom it may concern:*

Be it known that I, HENRY SCHUMACHER, of the city and county of Philadelphia, State of Pennsylvania, have invented a new and useful Folding Knife and Fork; and I do hereby declare the following to be a clear and exact description of the nature thereof, sufficient to enable others skilled in the art to which my invention appertains to fully understand, make, and use the same, reference being had to the accompanying drawing making part of this specification, in which—

Figure 1:
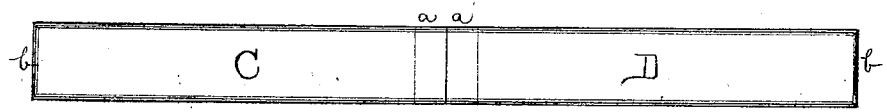
Figure 2:
Figure 3:
Figure 4:
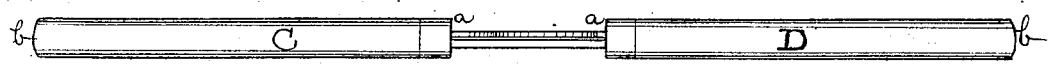
Figure 5:
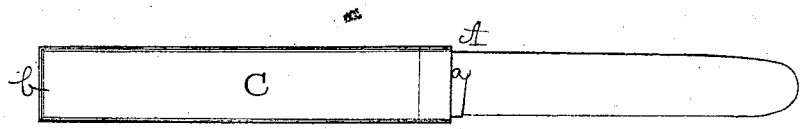
Figure 6:
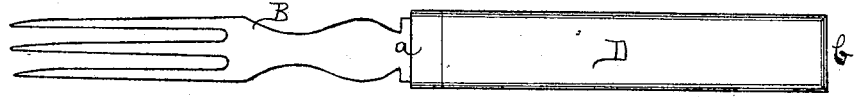

Figure 1 is a view of the folded knife and fork. Fig. 2 is a vertical section of one of the handles. Fig. 3 is an end view of the fork. Fig. 4 is a view showing the parts partly folded. Figs. 5 and 6 are views of the knife and fork detached or separated.

Similar letters of reference indicate corresponding parts in the several figures.

This invention consists in the construction of a knife and fork so that the blade of the knife may be completely inclosed in the handle of the fork, and the prongs of the latter in the handle of the knife, whereby, in folding the knife and fork, said blade and prongs are entirely concealed, the handles only being visible, and the latter form a solid casing closed on all sides.

Referring to the drawing, A represents the knife, and B the fork. C D are the handles thereof, which are made hollow, and open at one end, *a*, and closed at the other end, *b*. The tangs of the knife and fork are inserted in the respective handles at the open ends *a* and riveted thereto at one side so that in each handle a space, *c*, is left between the tang and the other side of the handle; or, in other words, that a portion of the hollow of each handle is occupied by a tang, and the remaining portion is free or forms a chamber, and this chamber or space will be of dimensions at least equal to the dimensions of the blade or prongs.

When it is desired to fold the knife and fork, the blade and prongs are laid side by side, as seen in Fig. 4, the prongs being in line with the chamber in the handle of the knife, and the blade in line with the chamber in the handle of the fork. Now, push the handles together, and the blade and prongs enter their respective chambers, and when to their full extent, they are entirely inclosed and concealed in said handles, and the latter only are visible.

It will be seen that the handles appear to be continuous of each other, and form a single casing closed on all sides without projecting parts. The folded device may then be conveniently and safely carried in the pocket, basket, elsewhere or otherwise, without danger of cutting or sticking the surrounding objects, or permitting access of dirt, &c., to the blade and prongs.

The device will be found useful for travelers, excursion parties, soldiers, and others requiring or desiring to carry eating implements with them.

I am aware that a knife and fork have been constructed to fold one with another, and I therefore disclaim broadly a folding knife and fork.

Having thus described my invention, what I claim as new, and desire to secure by Letters Patent, is—

The knife A and fork B, each provided with a hollow handle, the handles being closed at their outer ends and open at their inner ends, whereby, when the knife and fork are folded the blade is in the handle of the fork and the prongs are in the handle of the knife, with the open ends in contact, and the two handles form a single closed casing, the parts being arranged and operating substantially as described.

The above signed by me this 1st day of May, 1872.

HENRY SCHUMACHER.

Witnesses:
CHAS. E. BLUMNER,
JOHN A. WIEDERSHEIM.